United States Patent [19]
Hembre et al.

[11] Patent Number: 5,928,504
[45] Date of Patent: *Jul. 27, 1999

[54] FAUCET-MOUNTED WATER TREATMENT DEVICE

[75] Inventors: Richard D. Hembre, Edina; Brian F. Sullivan, Minneapolis, both of Minn.

[73] Assignee: Recovery Engineering, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/628,956

[22] Filed: Apr. 8, 1996

Related U.S. Application Data

[63] Continuation of application No. 08/207,380, Mar. 8, 1994, Pat. No. 5,527,451.

[51] Int. Cl.⁶ .................................................. B01D 35/143
[52] U.S. Cl. .............................. 210/88; 210/91; 210/424; 210/433.1; 210/434; 210/449; 210/460; 73/861.79; 73/861.87; 73/861.88; 222/14; 222/16; 222/20
[58] Field of Search ................................. 210/85, 87, 88, 210/89, 91, 100, 259, 282, 418, 419, 424, 433.1, 434, 435, 449, 460; 73/861.79, 861.88, 861.93; 116/264, 273; 222/14, 16, 20

[56] References Cited

U.S. PATENT DOCUMENTS

| | | |
|---|---|---|
| 1,008,849 | 11/1911 | Moore .................................. 73/861.88 |
| 3,762,440 | 10/1973 | Bryant .................................. 73/861.79 |
| 4,172,796 | 10/1979 | Corder . |
| 4,379,053 | 4/1983 | Brane . |
| 4,489,616 | 12/1984 | Priddy . |
| 4,681,677 | 7/1987 | Kuh et al. . |
| 4,686,037 | 8/1987 | Lang . |
| 4,698,164 | 10/1987 | Ellis . |
| 4,769,135 | 9/1988 | Norton . |
| 4,770,768 | 9/1988 | Lang . |
| 4,772,386 | 9/1988 | Grout et al. . |
| 4,885,081 | 12/1989 | Oliver . |
| 4,918,426 | 4/1990 | Butts et al. . |
| 5,050,772 | 9/1991 | Brane et al. . |
| 5,065,901 | 11/1991 | Brane et al. . |
| 5,089,144 | 2/1992 | Ozkahyaoglu et al. . |
| 5,099,870 | 3/1992 | Moore et al. . |
| 5,192,436 | 3/1993 | Sasaki et al. . |
| 5,254,242 | 10/1993 | van der Meer et al. . |

FOREIGN PATENT DOCUMENTS

| | | |
|---|---|---|
| 0 537 528 A1 | 4/1993 | European Pat. Off. . |
| 4094708 | 3/1992 | Japan . |
| 2 093 005 | 8/1982 | United Kingdom . |

*Primary Examiner*—Jan H. Silbaugh
*Attorney, Agent, or Firm*—Merchant & Gould P.C.

[57] ABSTRACT

A faucet-mounted water treatment device including a flow totalizer and an end-of-life indicator cooperating with the totalizer to tell the user when it is necessary to replace the filter cartridge. End-of-life indication is provided by a valve which stops flow after a predetermined volume has been filtered and by a rotating screen which shows the amount of useful life remaining in the filter cartridge.

37 Claims, 4 Drawing Sheets

FAUCET-MOUNTED WATER TREATMENT DEVICE

This application is a continuation of U.S. patent application Ser. No. 08/207,380, filed Mar. 8, 1994, now U.S. Pat. No. 5,527,451.

FILED OF THE INVENTION

This invention relates generally to water treatment devices, and more particularly to a faucet-mounted device with filter cartridge end-of-life indication.

BACKGROUND OF THE INVENITON

Water treatment devices for home and other use are well known in the art. Such devices are incorporated into a water system either in-line or at a terminal end. An example of the former would be an under-the-counter device which filters water prior to reaching the faucet. There are two common types of terminal end devices—countertop and faucet-mounted. As compared to countertop and under-the-sink devices, designing a faucet-mounted device presents special challenges. These include making the device sufficiently light so that it can be attached to a faucet and sufficiently compact so that the device does not take up valuable sink space.

Water treatment devices can treat water by the use of mechanical filtration or chemical treatment. Mechanical filters treat water by preventing passage of particulates. As a mechanical filter approaches the end of its useful life, reduced or stopped flow due to particulate accumulation provides a ready indication that element replacement is necessary. By contrast, when the capacity of a chemical element is exceeded, there is no such indication. Chemical treatment is accomplished by processes such as adsorption (e.g. charcoal media) and ion exchange (e.g. for lead removal). Such chemical treatment eventually degrades and becomes inactive. However, no indication is provided to the user that the water is no longer being treated by the media.

As a result, various approaches have been taken to indicate end of life to the user where it is not inherently provided by the behavior of the filter media. One example is shown in U.S. Pat. No. 4,686,037. In this approach, a pre-filter is used to entrap contaminants, and the color of the pre-filter is compared by the user with a reference strip to determine when the media requires replacement. The problem with this approach, however, is that it is inherently subjective, and therefore subject to error. Also, the user can easily forget to check the reference filter and mistakenly believe the media is still purifying when it is not.

A much more accurate and foolproof means of indicating end of life is through totalizing the volume which has passed through the media and automatically shutting off flow after a predetermined volume has passed through the device. Although the flow totalization and shutoff valve mechanisms required are relatively expensive and complex, this has become recognized as the most accurate means of indicating end of life. For example, the certifying agency in the United States for water treatment devices, the National Sanitation Foundation, requires for certification of a rated volume, twice the filter media capacity when an automatic shutoff is not used, and only 20% additional capacity when an automatic shutoff is employed.

Both electrical and mechanical approaches to flow totalization are known in the prior art. Examples of the former are shown in U.S. Pat. Nos. 4,918,426 and 5,089,144. In this approach, flow rate is measured by, for example, a pressure transducer and then integrated to calculate total volume. After a predetermined volume has been reached, a valve is electrically actuated to stop flow.

Examples of mechanical totalization in water treatment devices are shown in U.S. Pat. Nos. 4,681,677 and 4,698,164. In the mechanical approach, typically a turbine powered by water flowing through the device is interconnected with a series of gears which mechanically "add up" the volume of water which has passed through the device. In turn, the gearing mechanism is interconnected with a valve such that, after a predetermined volume of water has passed through the device, the valve is mechanically actuated to stop flow through the device.

However, prior art mechanical automatic shutoff mechanisms suffer from certain shortcomings. One problem is that the mechanisms employed, such as in the '677 patent, are too bulky to be included in a compact device. Another problem with prior art devices is that they make resetting the totalization and shutoff mechanism unnecessarily difficult and/or expensive. For example, to reset the device shown in the '677 patent, one would apparently have to manually release the valve from the rotating cam and manually disengage the gearing mechanism to reset the totalization mechanism to a zero volume position. In the '164 patent, the valve shutoff mechanism is incorporated into the replaceable cartridge, and the shutoff valve is connected to the gearing mechanism upon replacement of the cartridge. This approach is unnecessarily wasteful and expensive because the shutoff valve is thrown away with each cartridge, rather than being reused.

With respect to faucet-mounted water treatment devices, it is not known in the prior art to incorporate totalization and end-of-life indication. This is due at least in part to the obstacles associated with incorporating such systems in the required compact size. As a result, prior art devices have employed much cruder forms of end-of-life indication, such as that discussed above in the '037 patent. Not only are prior art end-of-life indicating devices much less accurate, but they are also unnecessarily wasteful due to the more frequent cartridge replacement often required by certification standards.

A feature that is common to faucet-mounted devices is the ability to bypass or divert water from the filter media so that untreated water can be obtained from the faucet. This is desirable because it avoids unnecessary use of the filter media, allowing the user to bypass the water treatment device if the water is not intended for drinking, as for example for washing hands or dishes.

Such a bypass mechanism is shown in the '037 patent. In this approach, a separate handle is attached to the opposite end of the mounting member to control a bypass valve. Other prior art devices use this same approach, and therefore suffer from certain disadvantages. The separate handle adds unnecessary complexity and expense to manufacturing a bypass mechanism. Also, because of the environment in which faucet-mounted devices are employed, there is a significant problem with keeping such devices clean. A separate handle only makes this more difficult, adding increased surface area and creating difficult-to-clean crevices. Finally, the added handle makes the appearance of the device less appealing, which is a particularly important concern for faucet-mounted devices.

What has been needed is a compact, low-cost and easy-to-manufacture water treatment device having an automatic shutoff mechanism which is easy to reset. What has also been needed is a faucet-mounted device incorporating totalization and end-of-life indication.

SUMMARY OF THE INVENTION

According to the present invention, a water treatment device having a replaceable filter cartridge is provided. The filter cartridge can include mechanical or chemical filter media or a combination thereof.

In one aspect of the invention, the water treatment device includes an arrangement comprising a mechanism for mechanically totalling the volume of water that has been filtered and a mechanism for indicating when the replaceable filter cartridge has reached the end of its useful life. End of life indication is provided by a valve mechanism for stopping flow after a predetermined volume has been filtered. The arrangement also comprises a mechanism for resetting the flow totalization mechanism, including a spring. The spring is connected with and biased by the flow totalization mechanism, and a mechanism for releasing the spring to reset the flow totalization mechanism is included. The spring can be any of a variety of mechanical springs which would be suitable for this purpose, including for example torsional, coil, leaf, and helical springs in either compression or tension.

In another aspect of the invention, the water treatment device includes an arrangement comprising a shutoff valve which closes to stop flow after a predetermined volume of water has passed through the cartridge. The arrangement further includes a spring which is loaded when the shutoff valve closes and a release arm which causes the spring to unload and force the shutoff valve open during replacement of the filter cartridge.

In another aspect of the invention, the water treatment device includes an arrangement comprising a mechanism for mechanically totalling the volume of water that has been filtered and a mechanism for indicating end of life by stopping flow after a predetermined volume has been filtered. A shutoff valve mechanism is permanently contained within the device such that it is not replaced upon replacement of the filter cartridge. The arrangement also comprises a mechanism for resetting the flow totalization mechanism, which includes a mechanism for resetting by replacement of the filter cartridge.

The reset mechanisms of the present invention can be employed not only in terminal-end water treatment devices, such as faucet-mounted and counter-top, but also in in-line devices, such as under-the-counter.

In another aspect of the invention, the water treatment device comprises a faucet-mounted device. The faucet-mounted device comprises a totalizer and an end-of-life indicator. End-of-life indication can be accomplished in a variety of different ways, such as by stopping flow of water through the filter cartridge after a predetermined volume of water has been filtered through the device, or by providing a visual indication of when it is necessary to replace the filter cartridge.

In yet another aspect of the invention, the water treatment device comprises a faucet-mounted device with a novel flow-bypass design. The faucet-mounted device comprises a housing with a filter element contained therein and having inlet and outlet openings. A mounting member includes inlet and outlet ports, with the inlet port being attachable to the faucet. A valve is in operable connection with the mounting member and the housing and includes first and second flow channels. The first flow channel extends between the inlet port and the inlet opening, and the second flow channel extends between the inlet and outlet ports. The valve body is rotatable with respect to the mounting member between first and second flow positions. In the first flow position, water flows from the inlet port, through the first flow channel, into the inlet opening of the housing, through the filter element and out the outlet opening of the housing. In the second flow position, water flows from the inlet port, through the second flow channel and out the outlet port of the mounting member. Therefore, by rotation of the housing, water is diverted from passing through the housing to passing through the mounting member.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
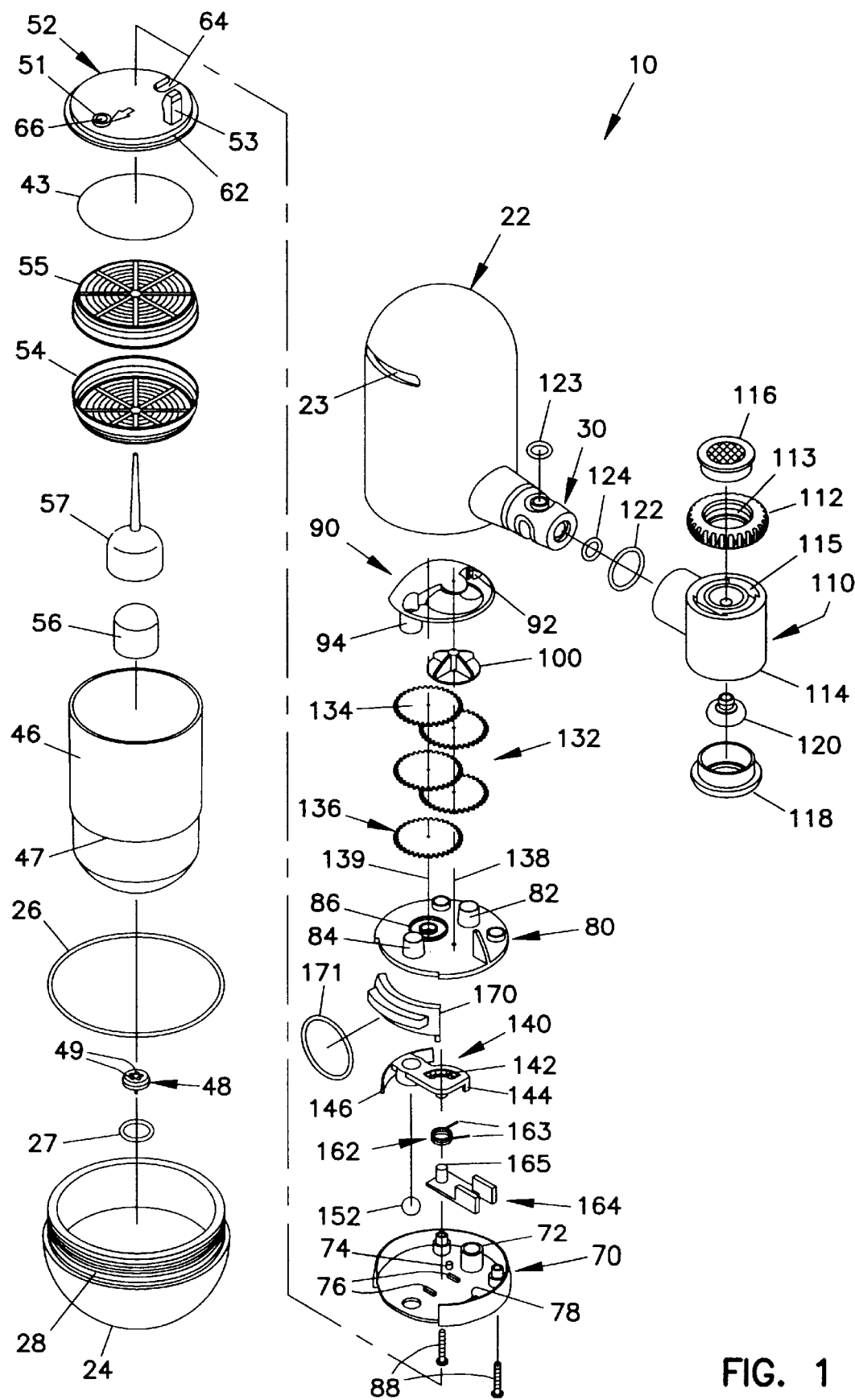
FIG. 1 is an exploded perspective view of a water treatment device according to the present invention.

Referring now to the drawings wherein like numerals designate like parts, a faucet-mounted water treatment device 10 is shown in FIGS. 1–8. Although water treatment device 10 is faucet mounted, many of the novel features disclosed herein can be incorporated into in-line or countertop devices as well.

Figure 2:
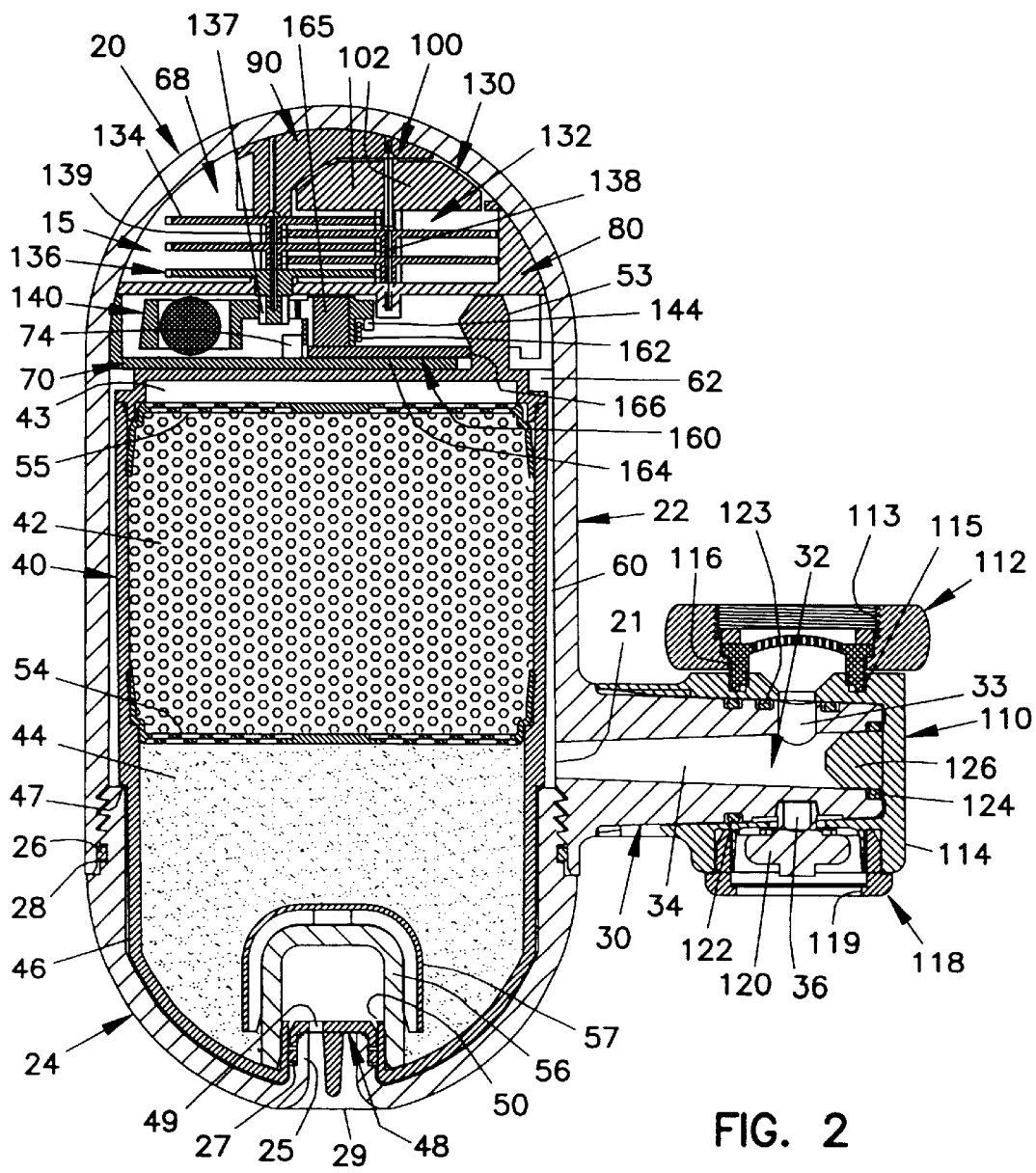
FIG. 2 is a cross-sectional view of the water treatment device shown in FIG. 1 as viewed generally from Section 2—2 of FIG. 4.

Referring to FIGS. 1 and 2, water treatment device 10 includes housing 20 which comprises upper portion 22 and cap 24 which threads into upper portion 22. First O-ring 26 is provided in channel 28 to create a watertight seal between upper portion 22 and cap 24. Replaceable filter cartridge 40 is inserted into upper portion 22 from below, and cap 24 is threaded to upper portion 22 to secure cartridge 40 in housing 20.

Water flows through housing 20 and cartridge 40 as follows. Water enters housing 20 from valve body 30 at inlet opening 21 and fills annular space 60 between cartridge 40 and housing 20, including peripheral annular channel 62 formed in top 52 of cartridge 40. As best shown in FIGS. 1 and 3, water then flows from channel 62, into notch 64 of top 52 and up through cylindrical portions 72, 82 of lower 70 and upper 80 plates, respectively. Water is then directed out of jet 92 of top plate 90 (best shown in FIG. 1) to turn blades 102 of turbine 100. Turbine 100 is tightly nested in top plate 90, as best shown in FIG. 2, with minimum clearance between blades 102 and top plate 90 to maximize turbine efficiency. Water exits turbine 100 and passes through exit cylinder 94 of top plate 90, which extends over second cylindrical portion 84 of upper plate 80.

In normal operation (i.e. when flow has not been "shut off"), water then flows into cartridge 40 through inlet opening 66 in top 52. While water primarily flows as described due to the arrangement of the various parts, it should be understood that water also fills chamber 68 generally defined between lower plate 70 up to upper portion 22 of housing 20. Water flows through cartridge 40 by passing through filter disc 43, second screen 55, first media 42, first screen 54, second media 44, and post filter 56, respectively, and then out through holes 49 in retainer 48. Water then exits housing 20 from outlet opening 29. It will be understood that outlet opening 29 could take on various configurations and could be from various positions in housing 20, although it is preferable that opening 29 be from bottom of housing 20.

Mounting member 110 is used to mount water treatment device 10 to a faucet (not shown). Adapter nut 112 defines inlet port 113 and is connected to body 114 by screen 116, which is shouldered by adaptor nut 112 and sealingly held in annular channel 115 of body 114. Aerator 118 and aerator nub 120 are inserted into body 114 from below, with aerator 118 defining outlet port 119. Mounting member body 114 extends over valve body 30, and they are sealed together by third 122, fourth 123 and fifth 124 O-rings. Fifth O-ring 124 surrounds extension 126 of body 114, which extends into axial channel 34 of valve body 30. Axial channel 34 is preferably tapered for ease of manufacturing by injection molding.

Valve body 30 is rotatable within mounting member 110 between two flow positions to allow the user to bypass cartridge 40 if desired. In the first flow position shown in FIG. 2, water flows from inlet port 113, through first flow channel 32 defined by radial 33 and axial 34 channels and into inlet opening 21 of housing 20. In the second flow position shown in FIGS. 7 and 8, water flows from inlet port 113, through C-shaped second channel 36 and out outlet port 119 of mounting member 110. It will be understood by those skilled in the art that first 32 and second 36 channels can be configured in a variety of other ways to achieve the result of diverting flow by rotation of housing 20. It will also be understood that it is not required that valve body 30 be molded as a single part with upper portion 22 of housing 20 as in the preferred embodiment, although it is required that valve body 30 be fixedly connected to housing 20.

Water treatment device 10 includes an arrangement 15 for indicating the useful life remaining in replaceable filter cartridge 40. Arrangement 15 includes flow totalization mechanism 130 and shutoff valve mechanism 150. It will be understood by those skilled in the art that a variety of totalization 130 and valve 150 mechanisms could be employed within the scope of the present invention to achieve the same purpose. Arrangement 15 also includes reset mechanism 160 for resetting totalization 130 and valve 150 mechanisms. In the preferred embodiment reset mechanism 160 includes biased spring 162 which is released by insertion of cartridge 40. However, it will be understood by those skilled in the art that spring 162 could be released by other means. It will also be understood that totalization 130 and valve 150 mechanisms could be reset by a variety of other mechanisms responsive to insertion of cartridge 40 which do not incorporate a spring.

In the preferred totalization mechanism 130, turbine 100 is connected with a plurality of gears 132 which in turn are connected with a rotating sector 140. It will be understood that turbine 100 need not be directly connected to first gear 134 and that sector 140 need not be directly connected to last gear 136. Gears 132 are successively interconnected, with each having a 10-to-1 ratio in the preferred embodiment. Turbine 100 and two gears 132 are stacked on first pin 138, and the remaining three gears 132, including first 134 and last 136 gears are stacked on second pin 139. Pins 138, 139 are held in place from above by upper portion 22 of housing 20. From below, first pin 138 is inserted into a hole in upper plate 80, and second pin 139 is held in place by last gear 136, which extends through and is seated on raised portion 86 of upper plate 80.

Figure 4:
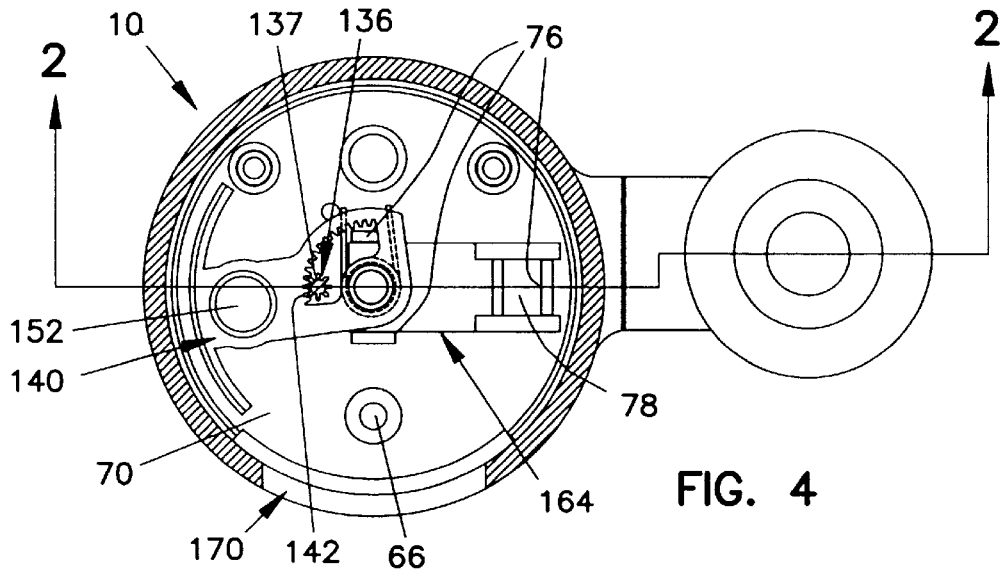
FIG. 4 is a top partial cross-sectional view of the flow shutoff mechanism of the present invention, with the mechanism in the zero volume position.
Figure 5:
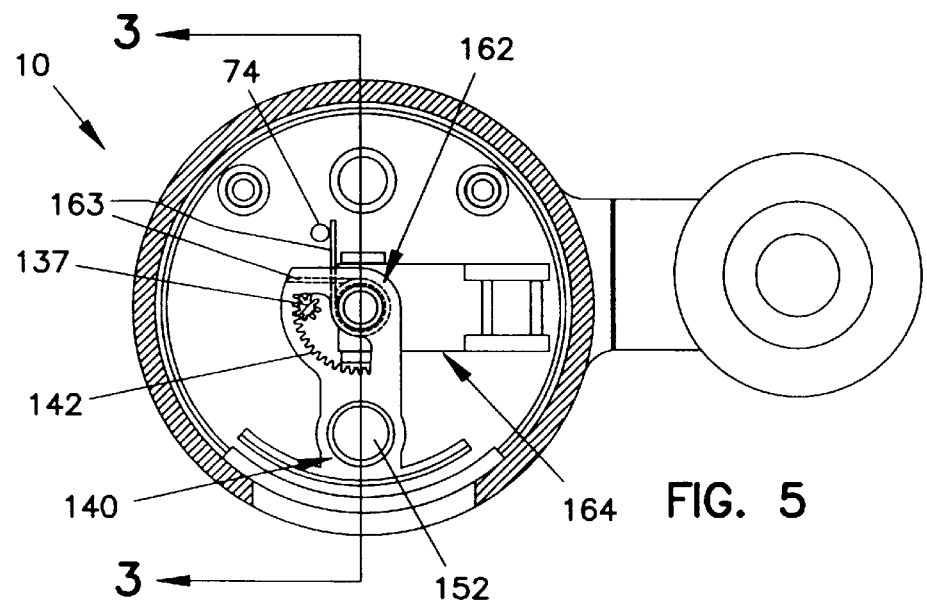
FIG. 5 is a top partial cross-sectional view of the flow shutoff mechanism of the present invention, with the flow shutoff mechanism at the end-of-life position.

Last gear 136 is connected to sector 140 by pinion 137 of last gear 136 engaging teeth 142 of sector 140, as best shown in FIGS. 4 and 5. Thus, as turbine 100 rotates, gears 132 are successively rotated, causing sector 140 to be rotated by pinion 137 and thereby "adding up" the volume of water that has passed through cartridge 40.

Figure 3:
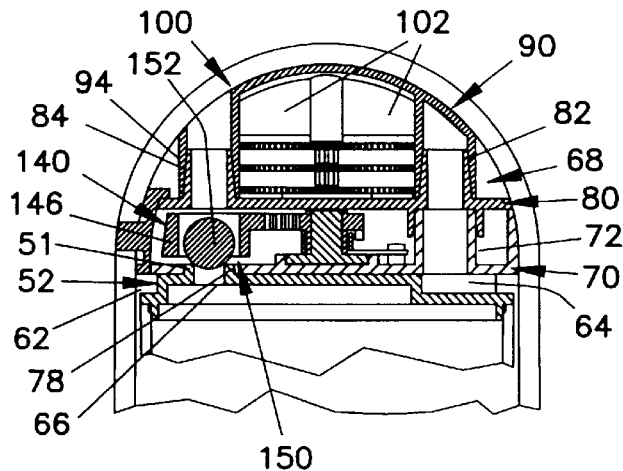
FIG. 3 is a partial cross-sectional view of the water treatment device shown in FIG. 1 as viewed from Section 3—3 of FIG. 5.

The preferred shutoff valve mechanism 150 includes ball 152, which is held by and rotated with sector 140, and flow inlet opening 66 of filter cartridge 40. Shutoff mechanism 150 starts in a zero volume position, as shown in FIGS. 2 and 4. After totalization mechanism 130 has rotated sector 140 to the flow stop position, as shown in FIGS. 3 and 5, ball 152 becomes seated in inlet opening 66 of cartridge 40, which is formed by raised portion 51 of top 52 extending through lower plate 70. It will be understood by those skilled in the art that a variety of other suitable mechanical valve mechanisms could also be employed.

Figure 6:
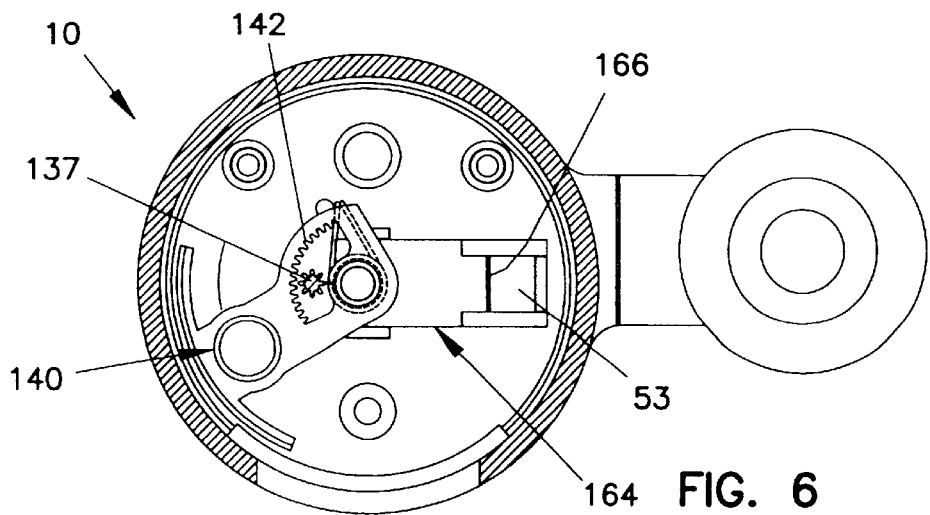
FIG. 6 is a top partial cross-sectional view of the flow shutoff mechanism of the present invention, with the flow shutoff mechanism in an intermediate position and the reset mechanism of the present invention activated.
Figure 8:
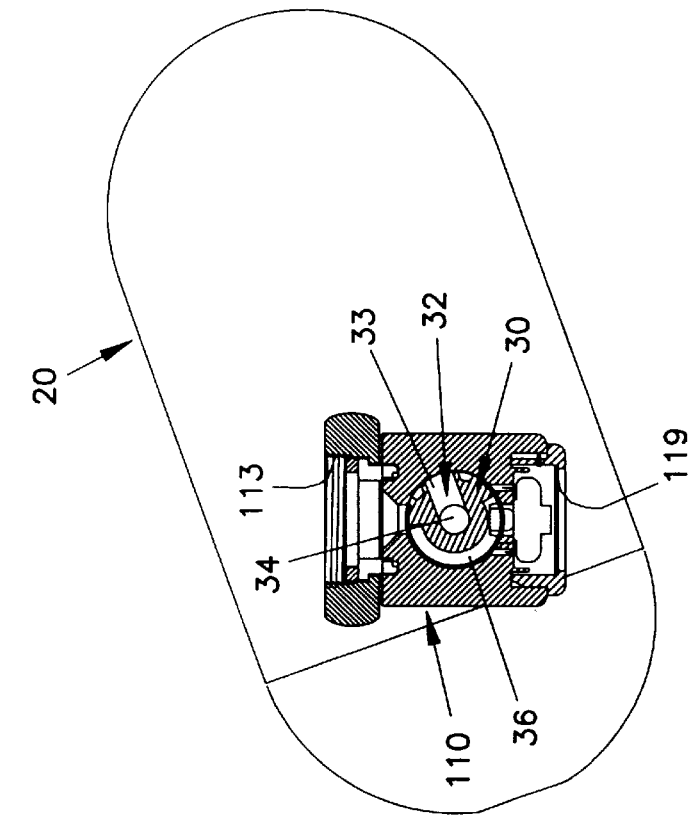
FIG. 8 is an end cross-sectional view of the flow-bypass mechanism shown in FIG. 7 as viewed from Section 8—8 of FIG. 7.
Figure 7:
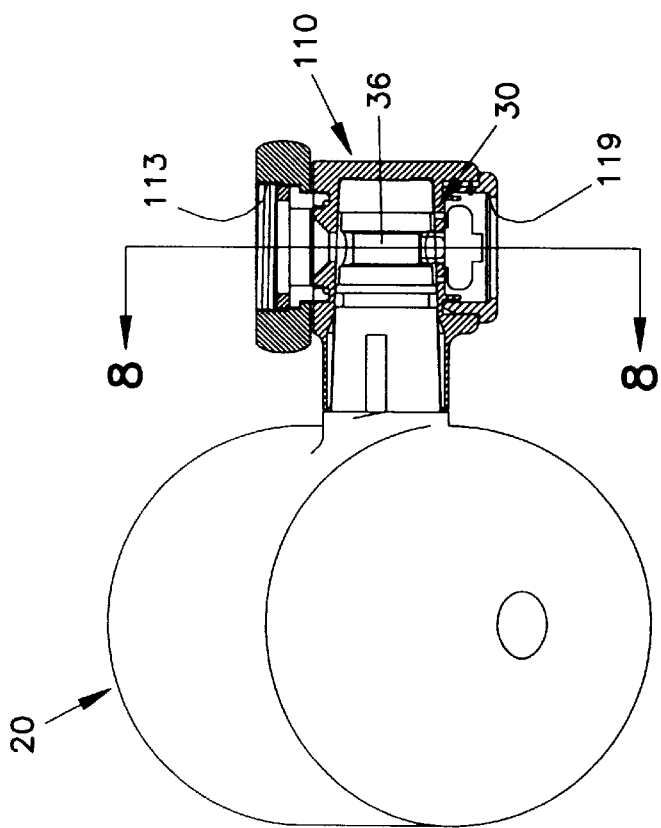
FIG. 7 is a cross-sectional view of a bypass mechanism according to the present invention, with the flow diverted through the mounting member.

Reset mechanism 160 includes spring 162 which is connected to and wound by sector 140 as sector 140 rotates. It will be understood that, while the preferred embodiment employs a wound coil spring 162, numerous other types of springs as discussed hereinabove and a variety of other arrangements and connections could be employed whereby a spring is biased by a flow totalization mechanism. To release spring 162 in the preferred embodiment, pinion 137 is radially disengaged from teeth 142 of sector 140, thereby causing sector 140 to be rotated back to the zero volume position by spring 162, as shown in FIG. 6. It will be understood that teeth 142 and pinion 137 could also be separated axially to achieve the same result.

In the preferred embodiment, spring 162 is released by a transverse movement of slide 164 acting as a release arm. Slide 164 includes vertical extension 165 onto which sector 140 and spring 162 are rotatably mounted. Spring 162 includes levers 163 extending from opposite ends, with one of levers 163 abutting stop 144 on sector 140 and the other lever 163 abutting fixed stop 74 on lower plate 70. This arrangement allows spring 162 to serve both the functions of resetting sector 140 and returning slide 164 to its unslid position because spring 162 resists torsional movement of sector 140 as well as transverse movement of slide 164. Slide 164 is held in line by guides 76 on lower plate 70. The components between upper 80 and lower 70 plates are held together by screws 88 inserted from below, as shown in FIG. 1.

In the preferred embodiment, slide 164 is slid by insertion and removal of filter cartridge 40. It will be understood that slide 164 could be moved in a variety of other ways, such as by pushing a button to reset totalization mechanism 130. It will also be understood that totalization mechanism 130 could also be reset by a variety of other mechanisms which are responsive to replacement of cartridge 40. For example, a mechanism could be constructed such that insertion of cartridge 40 causes last gear 136 to axially separate from sector 140, or that causes separation and turning of sector 140 without use of a spring 164.

In the preferred arrangement, slide 164 is slid by cam 53 extending axially from top 52 of cartridge 40. When cartridge 40 is axially inserted into housing 20, cam extends through opening 78 in lower plate 70 and abuts cam follower surface 166 on slide 164 to move slide 164 transversely.

In addition to providing a flow stop indication of end of life, a continuous visual indication of the amount of useful life remaining in replaceable filter cartridge 40 is provided in the preferred embodiment. This is accomplished by colored screen 146 at the end of sector 140, which is visible through lens 170 as sector 140 rotates. Referring to FIG. 1, lens 170 is inserted into slot 23 of upper portion 22 of housing 20, and is sealed by gasket 171.

In the preferred embodiment, cartridge 40 comprises two chemical filter media, including first media 42, which comprises an ion exchange resin suitable for removing lead, and second media 44, which comprises Granular Activated Charcoal ("GAC"). Mechanical or other chemical filter media can also be employed within the scope of the invention in various numbers or combinations. In the preferred cartridge 40, media 42, 44 are enclosed by base 46, O-ring retainer 48 which is friction fit with an inwardly extending cylindrical portion 50 of base 46, and top 52 which is friction fit with an inner side of the upper portion of base 46. Base 46 includes shoulder 47 which is supported by cap 24 to push cartridge 40 upwardly into housing 20. Retainer 48 holds second O-ring 27 in place to create a seal between retainer 48, cylindrical portion 50 and inward extension 25 of cap 24. Water exits cartridge 40 through holes 49 in retainer 48.

Within cartridge 40, filter media 42, 44 (not shown in FIG. 1) are separated by first screen 54, and second screen 55 separates first media 42 from filter disc 43 which is held between top 52 and second screen 55. Filter disc 43 is made of white filter paper and is for the purpose of providing the user with a visual reference to assure the user that cartridge 40 is performing its function and to indicate whether a particular cartridge has been used. In the preferred embodiment, top 52 is clear so that the user can see if disc 43 has gathered contaminants, indicating that the cartridge 40 has been used. U-shaped post filter 56 extends over cylindrical portion 50 to prevent GAC from being flushed out, and post filter cap 57 extends over filter 56 to direct the flow of water to bottom of cartridge 46 to assure that the entire second media 44 is utilized.

It should be understood that the present invention is not limited to the preferred embodiment discussed above, which is illustrative only. Changes may be made in detail, especially matters of shape, size, arrangement of parts, or material of components within the principles of the invention to the full extent indicated by the broad general meanings of the terms in which the appended claims are expressed.

What is claimed is:

1. A faucet-mounted water treatment device comprising:
   a mounting member, a replaceable filter cartridge and an arrangement;
   wherein said mounting member is for mounting the water treatment device on a household faucet;
   wherein said replaceable filter cartridge is in fluid communication with said mounting member;
   wherein said arrangement comprises
      totalizing means for adding up the volume of water that has flowed through said filter cartridge, and
      means, cooperating with said flow totalizing means, for indicating when said replaceable filter cartridge has reached the end of its useful life, wherein said indicating means is retained within said arrangement and is not replaced upon replacement of said replaceable filter cartridge.

2. A faucet-mounted water treatment device according to claim 1, wherein said indicating means is a visual indicator.

3. A faucet-mounted water treatment device according to claim 2, wherein said visual indicator also provides an indication of the useful life remaining in said replaceable filter cartridge before said filter cartridge has reached the end of its useful life.

4. A faucet-mounted water treatment device according to claim 1, wherein said totalizing means is a mechanical totalizer.

5. A faucet-mounted water treatment device according to claim 1, wherein said indicating means is a valve which reduces the amount of water flowing through said filter cartridge.

6. A faucet-mounted water treatment device according to claim 5, wherein said valve is constructed and arranged to stop water flowing through said filter cartridge.

7. A faucet-mounted water treatment device according to claim 5, wherein said valve is mechanically activated.

8. A faucet-mounted water treatment device comprising:
   a mounting member, a replaceable filter cartridge and an arrangement;
   wherein said mounting member is for mounting the water treatment device on a household faucet;
   wherein said replaceable filter cartridge is in fluid communication with said mounting member;
   wherein said arrangement comprises
      totalizing means for adding up the volume of water that has flowed through said filter cartridge, and
      visual means, cooperating with said flow totalizing means, for visually indicating when said replaceable filter cartridge has reached the end of its useful life, wherein said visual means is retained within said arrangement and is not replaced upon replacement of said replaceable filter cartridge.

9. A device according to claim 8, wherein said visual means also provides an indication of the useful life remaining in said replaceable filter cartridge before said filter cartridge has reached the end of its useful life.

10. A device according to claim 8, wherein said totalizing means is a mechanical totalizer.

11. A faucet-mounted water treatment device comprising:
   a mounting member, a replaceable filter cartridge and an arrangement;
   wherein said mounting member is for mounting the water treatment device on a household faucet;
   wherein said replaceable filter cartridge is in fluid communication with said mounting member;
   wherein said arrangement comprises
      a flow totalizer which adds up the volume of water that has been treated by said filter cartridge, and
      a visual indicator, cooperating with said flow totalizer, to visually indicate when said replaceable filter cartridge has reached the end of its useful life, wherein said visual indicator is retained within said arrangement and is not replaced upon replacement of said replaceable filter cartridge.

12. A water treatment device according to claim 11, wherein said flow totalizer is a mechanical totalizer.

13. A water treatment device according to claim 12, wherein said mechanical totalizer includes a turbine and a plurality of interconnected gears.

14. A water treatment device according to claim 11, wherein said visual indicator also provides a visual indication of the useful life remaining in said replaceable filter cartridge before said filter cartridge has reached the end of its useful life.

15. A faucet-mounted water treatment device comprising:
   a mounting member, a replaceable filter cartridge and an arrangement;
   wherein said mounting member is for mounting the water treatment device on a household faucet;
   wherein said replaceable filter cartridge is in fluid communication with said mounting member;
   wherein said arrangement comprises
      a flow totalizer which adds up the volume of water that has been treated by said filter cartridge, and
      an end-of-life indicator, cooperating with said flow totalizer, to indicate when said replaceable filter cartridge has reached the end of its useful life, wherein said end-of-life indicator is retained within said arrangement and is not replaced upon replacement of said replaceable filter cartridge.

16. A water treatment device according to claim 15, wherein said end-of-life is a visual indicator.

17. A water treatment device according to claim 16, wherein said visual indicator also provides visual indication of the amount of useful life remaining in said filter cartridge before said filter cartridge has reached the end of its useful life.

18. A water treatment device according to claim 15, wherein said flow totalizer and said end-of-life indicator are mechanical.

19. A water treatment device according to claim 15, wherein said flow totalizer includes a turbine.

20. A water treatment device according to claim 15, wherein said end-of-life indicator is a valve which reduces the amount of water flowing through said filter cartridge.

21. A water treatment device according to claim 15, wherein said flow totalizer and end-of-life indicator are substantially separate from said filter cartridge proximate a top of the water treatment device.

22. A water treatment device according to claim 16, wherein said flow visual indicator provides a visual indication of the amount of useful life remaining when the water treatment device is not being operated.

23. A water treatment device according to claim 15, wherein said flow totalizer is constructed and arranged to measure flow volume directly without having to assume a flow rate to determine volume over a timed interval.

24. A water treatment device according to claim 11, wherein said flow totalizer and visual indicator are substantially separate from said filter cartridge proximate a top of the water treatment device.

25. A water treatment device according to claim 11, wherein said flow totalizer and visual indicator are mechanical.

26. A water treatment device according to claim 11, wherein said flow totalizer is constructed and arranged to measure flow volume directly without having to assume a flow rate to determine volume over a timed interval.

27. A water treatment device according to claim 11, wherein said visual indicator provides a visual indication of the amount of useful life remaining when the water treatment device is not being operated.

28. A water treatment device according to claim 11, wherein said mounting member is also in fluid communication with said flow totalizer and indicator.

29. A water treatment device according to claim 11, wherein said flow totalizer, indicator and replaceable filter cartridge are in a common housing.

30. A water treatment device according to claim 11, further including a flow totalizer and indicator reset device constructed and arranged to automatically reset said totalizer and indicator upon replacement of said replaceable filter cartridge.

31. A water treatment device according to claim 30, wherein said reset device is mechanical.

32. A water treatment device according to claim 15, wherein said mounting member is also in fluid communication with said flow totalizer and indicator.

33. A water treatment device according to claim 15, wherein said flow totalizer, indicator and replaceable filter cartridge are in a common housing.

34. A water treatment device according to claim 15, further including a flow totalizer and indicator reset device constructed and arranged to automatically reset said totalizer and indicator upon replacement of said replaceable filter cartridge.

35. A water treatment device according to claim 34, wherein said reset device is mechanical.

36. A faucet-mounted water treatment device, comprising:
   (a) a member constructed and arranged to mount the water treatment device on a household faucet;
   (b) a replaceable filter cartridge in fluid communication with said mounting member;
   (c) a flow totalizer which adds up the volume of water that has been treated by said filter cartridge; and
   (d) a visual indicator, cooperating with said flow totalizer, to provide a visual indication of the useful life remaining in said replaceable filter cartridge before and after said filter cartridge has reached the end of its useful life.

37. A faucet-mounted water treatment device, comprising:
   (a) a member constructed and arranged to mount the water treatment device on a household faucet;
   (b) a replaceable filter cartridge in fluid communication with said mounting member;
   (c) a flow totalizer which adds up the volume of water that has been treated by said filter cartridge;
   (d) an end-of-life indicator, cooperating with said flow totalizer, to indicate when said filter cartridge has reached the end of its useful life; and
   (e) a flow totalizer and indicator reset device constructed and arranged to automatically reset said totalizer and indicator upon replacement of said replaceable filter cartridge.

* * * * *

UNITED STATES PATENT AND TRADEMARK OFFICE
CERTIFICATE OF CORRECTION

PATENT NO. : 5,928,504
DATED : July 27, 1999
INVENTOR(S) : Hembree et al.

It is certified that error appears in the above-identified patent and that said Letters Patent is hereby corrected as shown below:

Title page,
Item [75] Inventors: "Hembre" should read --Hembree--

Column 1,
Line 13: "INVENTION' should read --INVENTION--

Column 8,
Line 20, claim 4: insert --flow-- after the word "said"

Column 9,
Line 50, claim 22: delete "flow" before the word "visual"

Signed and Sealed this

Third Day of July, 2001

*Attest:*

NICHOLAS P. GODICI
*Attesting Officer*   Acting Director of the United States Patent and Trademark Office